W. W. WOODWARD.
Cotton-Planter.

No. 210,390.  Patented Nov. 26, 1878.

WITNESSES  
F. L. Durand  
J. J. McCarthy

INVENTOR  
W. W. Woodward  
Alexander Mason  
his Attorneys

UNITED STATES PATENT OFFICE.

WILLIS W. WOODWARD, OF ATHENS, GEORGIA.

IMPROVEMENT IN COTTON-PLANTERS.

Specification forming part of Letters Patent No. 210,390, dated November 26, 1878; application filed October 8, 1878.

*To all whom it may concern:*

Be it known that I, WILLIS W. WOODWARD, of Athens, in the county of Clarke, and in the State of Georgia, have invented certain new and useful Improvements in Cotton-Planters; and do hereby declare that the following is a full, clear, and exact description thereof, reference being had to the accompanying drawings, and to the letters of reference marked thereon, making a part of this specification.

The nature of my invention consists in the construction and arrangement of a machine for planting cotton-seed, as will be hereinafter more fully set forth.

In order to enable others skilled in the art to which my invention appertains to make and use the same, I will now proceed to describe its construction and operation, referring to the annexed drawing, in which—

Figure 1:
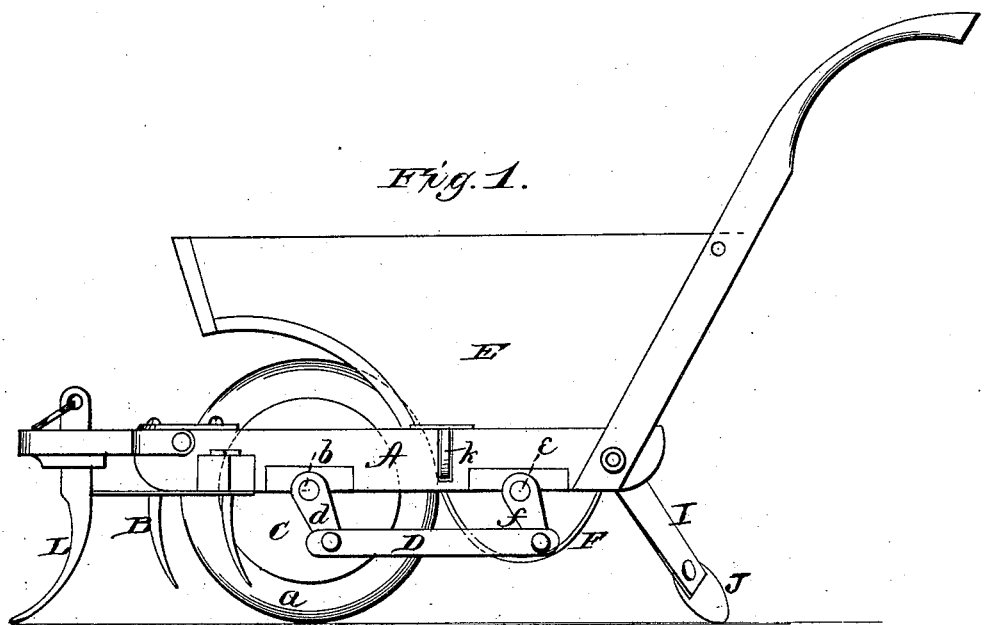
Figure 2:
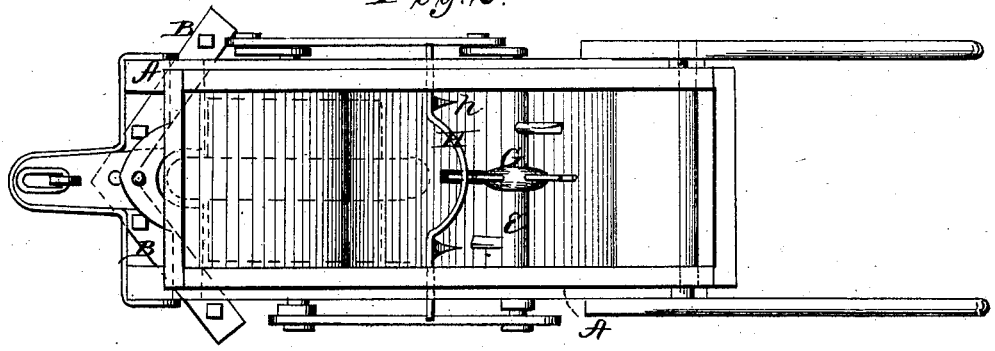
Figure 3:
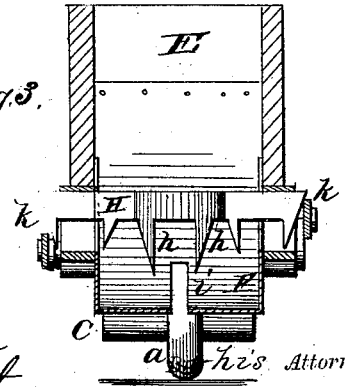

Figure 1 is a side elevation, and Fig. 2 a plan view, of my machine. Fig. 3 is a detailed section of the same.

A A represent two beams or rails, one on each side, to the front ends of which is attached a harrow, B, for the purpose of removing clods, sticks, &c., from the cotton-bed. In rear of the harrow is a wheel, C, having its journal-bearings in boxes attached to the beams A. This wheel is provided with a central circumferential projection, $a$, which forms a groove in the furrow for the reception of the seed. On the ends of the axle or journals $b$ of the wheel C are attached cranks $d$, which are placed at right angles, and on these cranks are attached connecting-bars D D, extending to and connecting with similar cranks $f f$ on the ends of the feed-shaft $e$. The feed shaft or axle $e$ is placed in rear of the driving-wheel C, extending through the seed-box E, and resting in metal boxes. A cast or sheet iron bottom, F, having a slot, $i$, extends below the feed-axle. In the center, on the feed-axle $e$, is secured a spiked stirrer, G, which, by means of the four cranks $d\ f$, obtains a rotary motion. The seed-box E extends above the feed-axle, and through it extends a curved metal bar, H, provided with downwardly-projecting teeth $h$. This bar rests in slots in side beams A, and has a lateral reciprocating motion produced or imparted to it by the action of the connecting-bars D D against an inclined lug or projection, $k$, at each end of the bar H. This toothed bar H agitates the seed in the seed-box, causing them to fall down upon the feeding or planting devices in such a manner as to insure a continuous distribution of seed in the groove formed by the driving-wheel.

At the rear of the seed-box, to the end of each side rail, is attached a cotton-seed coverer consisting of a spring, I, having a sort of half-twist curving inwardly, to which a proper foot, J, is attached. The shape of these spring-bars is such that they will press downward and together, adjusting themselves to clods or uneven ground, and thereby making the covering of the seed certain.

In front of the driving-wheel is a suitable furrow-opener, L; but the wheel itself forms the proper groove, and acts as a gage as to the depth the seed are planted, making the depth uniform in all soils.

Having thus fully described my invention, what I claim as new, and desire to secure by Letters Patent, is—

1. The horizontal toothed bar H, provided with inclined ends $k\ k$, arranged across the seed-box, and having a lateral reciprocating motion through the means of the pitmen D acting on the inclined ends $k$, as and for the purposes herein set forth.

2. The combination of the rotary stirrer G and the laterally-reciprocating toothed bar H, as and for the purposes herein set forth.

3. The combination of the wheel C with projection $a$, rotary stirrer G, laterally-reciprocating agitator H, and coverers I J, all constructed substantially as and for the purposes herein set forth.

In testimony that I claim the foregoing I have hereunto set my hand this 19th day of September, 1878.

WILLIS W. WOODWARD.

Witnesses:
H. R. PALMER,
R. J. FELTON.